United States Patent [19]
Matsui et al.

[11] 3,893,135
[45] July 1, 1975

[54] APPARATUS FOR MOVING LENS OF CAMERA FOR FOCUSING

[75] Inventors: Toru Matsui, Sakai; Akira Yoshizaki, Osaka; Yasuzi Kogure, Kawanishi, all of Japan

[73] Assignee: Minolta Camera Kabushiki Kaisha, Osaka, Japan

[22] Filed: Feb. 4, 1974

[21] Appl. No.: 438,959

[30] Foreign Application Priority Data
Feb. 21, 1973 Japan.............................. 48-22641

[52] U.S. Cl. .................. 354/167; 354/197; 355/58
[51] Int. Cl.² ...................................... G03B 13/20
[58] Field of Search .......... 354/167, 197; 355/56, 58

[56] References Cited
UNITED STATES PATENTS
3,687,041    8/1972    Norris.................................. 354/167

*Primary Examiner*—Richard A. Wintercorn
*Attorney, Agent, or Firm*—Wolder & Gross

[57] ABSTRACT

An apparatus comprising a movable focusing member, a focusing ring movable therewith to vary the amount of focusing movement of a main taking lens and a lens unit including a lens for special photography having an optical axis coinciding with that of the main taking lens when the lens unit is selectively set in position for special photography. The lens unit has a portion operable to control the focusing member by the unit being set in position and to thereby automatically set the main taking lens in a specified focused position for special photography.

10 Claims, 6 Drawing Figures

APPARATUS FOR MOVING LENS OF CAMERA FOR FOCUSING

BACKGROUND OF THE INVENTION

The present invention relates to cameras such as simple-type cameras using 16 mm film in which the finder optical system is provided separately from the taking lens system and which are adapted for close-up photography, macrophotography or like special photography when equipped with a lens for special photography, more particularly to an apparatus for effecting focusing movement of the lens which is so adapted that the main taking lens can be set at a specified focused position by setting the lens for special photography in position.

Conventionally, when taking a close-up photograph, macrophotograph or like special photograph with simple cameras such as described above, a suitable lens for special photography is mounted in front of the main taking lens of the camera in optical alignment therewith so as to adapt the camera for a given subject distance. The lens for special photography is designed to give the best results in respect of focusing and aberration only when the lens and the main taking lens are in a definite relationship, namely when the main taking lens is brought to a specified focused position. Furthermore after the lens for special photography has been set in position for special photography, it is impossible to focus the lens system while viewing through the finder. The main taking lens must therefore be set at the specified focused position previously. Otherwise, it is impossible to obtain a sharp photograph.

Accordingly, some indication may conceivably be provided in the finder to notify that the special photographic lens has been set in position and to thereby urge the photographer to move the main taking lens to the specified position, but this still involves the inconvenience that the photographer must move the main taking lens after recognizing the indication.

SUMMARY OF THE INVENTION

An object of this invention is to eliminate the above-mentioned drawback conventionally experienced and to make the camera very easy to use for special photography by providing an apparatus which is so adapted that the main taking lens can be brought to a specified focused position automatically by setting a lens for special photography in position for special photography.

Another object of this invention is to provide an apparatus of a very simple construction for automatically effecting the focusing movement of the main taking lens described above.

In order to fulfil the foregoing objects, a camera including a movable focusing member and a focusing ring rotatable by the movement of the focusing member to vary the amount of focusing movement of a main taking lens is equipped with a lens unit for special photography which is removably mountable on or housed in the camera body and which includes a lens for special photography such as close-up photography or macrophotography. When the lens unit is mounted on the camera body or set in a specified position within the camera body, the lens for special photography is set in front of the main taking lens with its optical axis coinciding with that of the main taking lens.

The setting of the lens unit in position for special photography causes the same to act indirectly or directly on the focusing member and, the lens unit has a portion for determining the position of the focusing member to set the main taking lens at a specified focused position when the lens unit is set in position.

Thus the mounting of the lens unit on the camera body or the setting of the same in position within the camera body for special photography moves the focusing member therewith so as to determine the position of the member, whereby the main taking lens is automatically brought to the specified position where the main taking lens has completed proper focusing movement. Accordingly, there is no need to move the main taking lens separately and singly for special photography. In fact, the focusing movement involves no difficulty and does not require a complex mechanism.

The focusing member is adapted to be moved directly by an operating member provided, for example, outside the camera. Generally with simple cameras described, the focusing member is biased in one direction and there is provided a latch member for retaining the focusing member at its set position.

At least when the camera is in condition for ordinary photography, the latch member engages the focusing member as positioned upon completion of focusing to thereby prevent the movement of the focusing member against the biasing force.

The lens unit for special photography is further provided with a portion adapted to act, when the unit is set for special photography as described above, on the latch member and to disengage the same from the focusing member before the position of the focusing member is determined. Consequently, the setting of the lens unit for special photography first releases the focusing member from the latch member, so that the position can be determined subsequently without any trouble.

Other objects and features of this invention will become more apparent from the following description.

DESCRIPTION OF THE PREFERRED EMBODIMENTS

Figure 1:
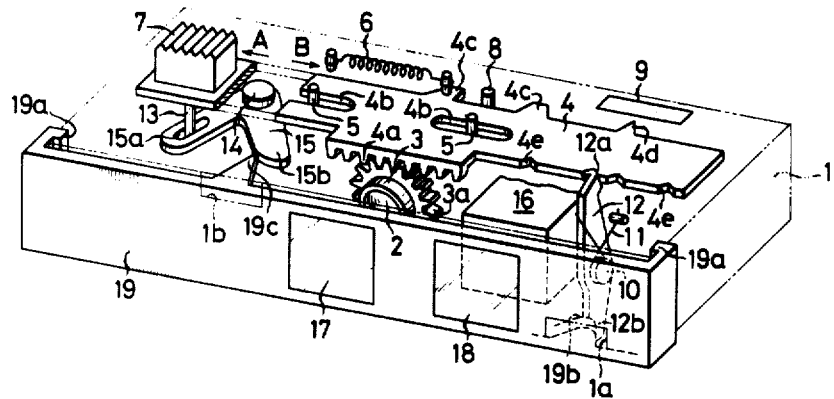
FIG. 1 is a perspective view showing an embodiment of this invention.

FIG. 1 shows a simple-type camera equipped with a focusing apparatus in accordance with the present invention and a lens unit for special photography.

A focusing ring 3 mounted in a camera body 1 and including a main taking lens 2 is formed along its outer periphery with a gear 3a meshing with the rack 4a of a focusing member 4.

The focusing member 4 has a slot 4b in which engages a pin 5 projecting from the camera body 1, whereby the focusing member 4 is supported by the camera body 1. It is movable by being guided by the pin 5 and is biased in the direction of an arrow A by a spring 6.

If, for example, the clockwise rotation of the focusing ring 3 moves the main taking lens 2 and focuses the same on a distant subject, whilst the counterclockwise rotation of the ring 3 moves the main taking lens 2 to focus the same on a near subject, the movement of the focusing 4 in the direction of the arrow A under the tension of the spring 6 effects focusing on a subject at a near distance while the movement of the same in the direction of an arrow B focuses the lens on a distant subject.

A knob 7 projecting from the focusing member 4 above the camera body 1 is moved in the direction of the arrow A or B to move the focusing member 4 as above.

The focusing member 4 is formed in its rear edge with a pair of projections 4c opposing a stopper pin 8 fixed to the camera body 1 so that the engagement between the projections and the stopper pin will limit the range of movement of the member 4. The focusing member 4 further has an index mark 4d opposing the scale of a subject distance indicating plate 9 placed on the camera body 1 to indicate the subject distance when the member 4 is set in position. Several notches 4e are formed in the front edge of the member 4.

A latch member 12 in the form of a lever pivoted by a pin 10 to the camera body 1 and biased by a spring 11 in a clockwise direction has at its upper end a lug 12a which engages, for ordinary photography, in one of the notches 4e in the focusing member 4 to retain the member 4 at a position determined by focusing against the action of the spring 6. When thus latching, the latch member 12 has its lower end 12b positioned in a small window 1a formed in the front of the camera body 1.

For ordinary photography, the focusing member 4 is moved by the knob 7 and set in position, whereupon the upper end lug 12a of the latch member engages in one of the notches 4e, thereby preventing the member 4 from moving in the direction of the arrow A against the action of the spring 6. In this way, the main taking lens 2 can be retained as focused on infinity, medium or near distance during ordinary photographing operation.

The focusing member 4 is further provided on its under surface with a pin 13 which is engaged in a slot 15a formed in an arm of control cam 15 pivotally supported by a pin 14 on the camera body 1. Thus the member 4 moves with the cam 15 by means of a pin 13, the former being reciprocally movable in the directions of arrows A and B, the latter being pivotally reciprocally movable about the pin 14.

The control cam 15 has another arm serving as a cam portion 15b which is positioned behind another window 1b formed in the front wall of the camera body 1.

Within the camera body 1 there is disposed a finder 16 having a finder objective in its front.

A lens unit 19 for special photography including a lens 17 for special photography such as close-up photography or macrophotography and a finder correction lens 18 has opposite ends which are bent to extend along the opposite sides of the camera body 1. The bent portions are provided with inward projections 19a which are removably engageable in recesses in the camera body 1 (the recesses being not shown in FIGS. 1, 3 and 4 but shown in FIG. 5 as will be described later).

With reference to FIG. 1, the lens unit 19 is pushed onto the front of the camera body 1, with the projections 19a clicking into the recesses, whereby the unit 19 is rigidly mounted on the camera body 1. When the unit 19 is thus mounted, the optical axis of the lens 17 for special photography coincides with that of the main taking lens 2, and the optical axis of the finder correction lens 18 coincides with that of the finder 16.

The lens unit 19 further has, on its rear surface, projections 19b and 19c which are adapted to enter the windows 1a and 1b in the front of the camera body 1 respectively. When mounting the lens unit 19 on the camera body 1, the projection 19b first pushes the lower end of the latch member 12 in contact therewith which end is positioned at the window 1a, thereby turning the member 12 in a counterclockwise direction against the spring 11 thereon. Subsequently, the projection 19c pushes the cam portion 15b of the control cam 15 in contact therewith which portion is positioned behind the window 1b, turning the control cam 15 in a counterclockwise direction.

The unit 19 includes the lens 17 for special photography to give the camera a focal distance appropriate to the photographing purpose for which it is used and finder correction lens 18. Accordingly, the focal distance of the lens 17 varies from unit to unit depending on the photographing purpose, and the projections 19c of different units 19 have different lengths. The length of projection 19c on a particular unit 19 is such that when the unit 19 is set in position, the projection 19c can move the main taking lens 2 by a specified amount to give the best focus and least aberration in connection with the focal distance of the lens 17 included in that unit.

When taking an ordinary photograph without mounting the lens unit 19 on the camera body 1, the knob 7 projecting from the camera body 1 is pushed or pulled to move the focusing member 4 in the direction of the arrow A or B and to thereby rotate the focusing ring 3 for the focusing movement of the main taking lens 2.

During the foregoing movement of the focusing member 4, the lug 12a at the upper end of the latch member 12 is in sliding contact with the notched front edge of the member 4 under the action of the spring 11. When the knob 7 is released from the hand, the spring 6 forces the focusing member 4 in the direction of the arrow A, with the result that the lug 12 engages in one of the notches 4e which is positioned most proximate to the lug 12a on one side thereof toward the direction of the arrow B. By virtue of the force of the spring 11 which is greater than that of the spring 6, the latch member 12 therefore retains the focusing member 4 at its engaged position and consequently maintains the main taking lens 2 at a focused position corresponding to the subject distance. The above procedure may be followed with reference to the index mark 4d on the focusing member 4 opposing the subject distance indicating plate 19.

Figure 2:
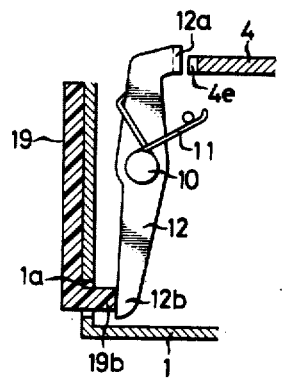
FIG. 2 is a fragmentary side elevation of the same.

When taking a special photograph, the lens unit 19 having a lens 17 giving a subject distance in conformity with the photographing purpose is mounted on the camera body 1. This causes the projection 19b on the unit 19 to push and turn latch lever 12 in a counterclockwise direction as seen in FIG. 2, releasing the focusing member 4 from the latch lever. As a result, the member 4 moves under the action of the spring 6, followed by the movement described below.

Suppose the main taking lens 2 has been set, before the lens unit 19 is mounted at a position as displaced by an amount smaller than the specified amount of focusing movement determined in connection with the lens 17 for special photography, namely if the focusing member 4 is positioned toward the direction of arrow B from the specified central position corresponding to the above-mentioned specified amount of focusing movement of the main taking lens 2, the projection 19c will still be out of contact with the cam portion 15b of the control cam 15 when the latch member 12 is pushed by the projection 19b to disengage the focusing member 4 therefrom upon the mounting of the lens unit 19. Consequently, the focusing member which is movable by the action of the spring 6 is forced toward the direction of the arrow A upon the disengagement, causing the pin 13 to turn the control cam 15 in a clockwise direction.

The cam portion 15b of the control cam 15 is stopped against further turning upon contact with the projection 19c of the unit 19 placed in through the window 1b by the lens unit 19 being mounted on the camera body 1, whereby the focusing member 4 is stopped in the course of its movement in the direction of the arrow A. Thus the main taking lens 2 is set in a specified focused position which is determined by the length of the projection 19c.

In this way, simultaneously with the completion of mounting of the lens unit 19 for special photography, the main taking lens 2 is completely set at the specified focused position automatically. In this state, the optical axes of the lens 17 for special photography and those of the finder correction lens 18 and finder 16 coincide with each other correctly, respectively.

On the other hand, if the main taking lens 2 has been set, before the lens unit 19 is mounted, at a position by being moved through an amount larger than the aforesaid amount of focusing movement, namely if the focusing member 4 is positioned toward the direction of arrow A from the specified central position, the mounting of the lens unit 19 on the camera body 1 first causes the projection 19b to free the focusing member 4 and subsequently brings the projection 19c, placed into the camera body 1 from the window 1b, into pushing contact with the cam portion 15b of the control cam 15 to turn the cam 15b in a counterclockwise direction.

Consequently, the focusing member 4 with the pin 13 engaged in the slot 15a of the cam 15 is moved in the direction of the arrow B to rotate the focusing ring 3. The completion of mounting of the lens unit 19 stops the parts, whereby the main taking lens 2 is set in the aforesaid specified focused position automatically completely.

Figure 3:
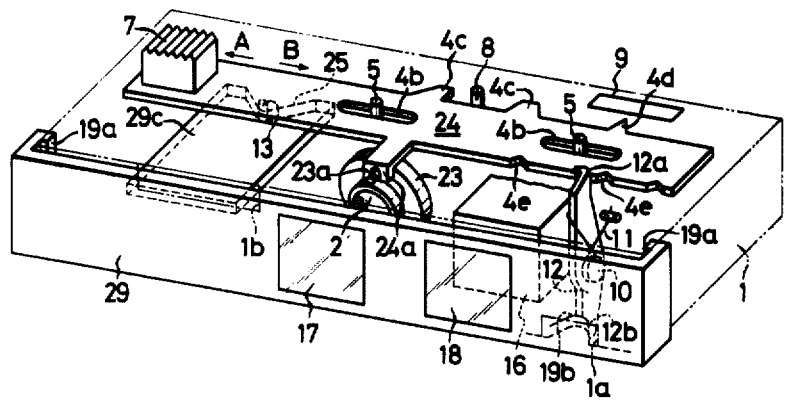
FIG. 3 is a perspective view of another embodiment.

FIG. 3 shows an embodiment wherein a focusing member 24 is not biased in one direction but is adapted to be stopped at any desired focusing position. A focusing ring 23 for moving the main taking lens 2 for focusing and the focusing member 24 are made movable together by the engagement of a pin 23a on the ring 23 with a forked portion 24a of the member 24. In this embodiment, the illustrated latch member 12 can be dispensed with. Further in place of the control cam 15 in FIG. 1, a lens unit 29 for special photography has a projection 29a formed with a V-shaped cam portion 25 at its distal end. The mounting of the lens unit 29 on the camera body 1 brings the cam portion 25 into engagement with a pin 13 on the focusing member 24 to set the main taking lens 2 in a specified focused position. Based on the same idea as in the embodiment of FIG. 1, lens units 29 intended for different photographing purposes have cam portions 25 whose bottoms are positioned toward the direction of the arrow A or B differently in corresponding relation to the lenses 17 included therein, such that when a particular lens unit 29 having a peculiar cam portion 25 is set in position, the cam portion 25 can move the main taking lens 2 by a specified amount to give the best focus and least aberration in connection with the focal distance of the lens 17 included in that unit. Members and parts similar to those in FIG. 1 are referred to by the same reference characters to omit the description thereof. The operations of these parts and portions will be apparent with reference to the description of FIG. 1. The same is true for FIG. 4.

With reference to FIG. 3, when the camera is not equipped with the lens unit 29 for special photography to take an ordinary photograph, the lug 12a of the latch member 12 engages in one of the notches 4e of the focusing member 24 as in FIG. 1 to retain the member 24 against movement and to thereby set the main taking lens 2 in a focused position corresponding to the engaged notch 4e. The knob 7 is moved to slide the focusing member against the action of the latch member 12, whereby the pin 23a in engagement with the forked portion 24a is pushed to rotate the focusing ring 23 and to thereby vary the amount of focusing movement of the main taking lens 2. Thus exactly in the same manner as in FIG. 1, the main taking lens 2 is settable in a focused position corresponding to the subject distance.

For special photography, the lens unit 29 is mounted on the camera body 1, whereby the projections 19b and 29c are placed into the camera body 1 through the windows 1a and 1b. First, the projections 19b pushes the lower end 12of the latch member 12 to disengage the focusing member 24 as is the case with FIG. 1.

After the disengagement, the cam portion 25 of the projection 29c placed in through the window 1b engages the pin 13 on the focusing member 24. The cam portion 25 is V-shaped as illustrated to position the pin 13 at the bottom of the V shape when the lens unit 29 is completely mounted on the camera body 1, so that even if the focusing member 24 is located toward the direction of the arrow A or B from the position where it gives the main taking lens 2 a specified amount of focusing movement for special photography, the mounting of the lens unit causes the slanting surface of the cam portion 25 to push the pin 13 and permits the bottom of the cam portion 25 to determine the position of the focusing member 24 as specified simultaneously with the completion of the mounting. The main taking lens 2 is set in the specified focused position therefore.

Figure 4:
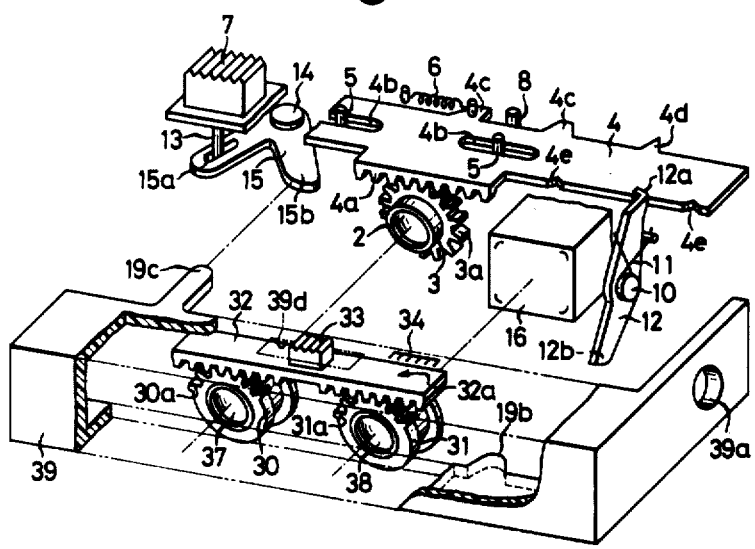
FIG. 4 is a perspective view of another embodiment in which a lens for special photography is also provided with focusing means.

FIG. 4 shows an embodiment including a lens 37 for special photography comprising groups of lenses, the distance between the lens groups being variable manually by known means for focusing at a desired subject distance within a predetermined range. This embodiment is exactly identical to that of FIG. 1 in the construction of the mechanism in the camera body and the mechanism for setting the main taking lens 2 at a specified focused position for special photography.

With reference to FIG. 4, a sector gear 30a is formed in a focusing ring 30 for special photography including the lens 37 composed of groups of lenses. Likewise, a correction ring 31 including a finder correction lens 38 is formed with a sector gear 31a. The gear 30a and 31a mesh with a rack 32 slidably supported by a lens unit 39 for special photography.

The rack 32 is slidingly movable leftward and rightward in the drawing by a knob 33 projecting upward from the unit 39 through its window 39d. The rings 30a and 31a are rotatable by the movement of the rack 32.

The lens unit 39 for special photography is mounted on the illustrated camera body using a mounting hole 39a. At this time, as already described repeatedly, the projection 19b frees the focusing member 4 from latching engagement and the projection 19c subsequently pushes and turns the control cam 15, thereby setting the main taking lens 2 in a specified focused position.

The knob 33 is thereafter pushed to move the rack 32 leftward or rightward and to vary the distance between the lens groups of the lens 37 for special photography. Accordingly, the lens system can be focused on a desired subject distance within a predetermined range. The focusing movement may be made with reference to an index mark 32a on the rack 32 pointing a subject distance indicating scale 34.

By virtue of the foregoing movement, the correction ring 31 including the finder correction lens 38 is also moved to correct the magnification of the finder and the like.

In the case where focusing can be effected by the lens 37 for special photography although within a given range, the main taking lens 2 of the camera need not necessarily be retained in a specified focused position, but both the lens 37 and the main taking lens 2 may conceivably be adapted for focusing movement in operative relationship, which however invariably requires a complex mechanism.

In contrast, when the main taking lens 2 is adapted to be moved to and retained at the specified focused position by mounting the lens unit 39 on the camera body as illustrated in FIG. 4, there is no need to use a complex coupling mechanism, hence the advantage of extremely simplified mechanism.

Figure 5:
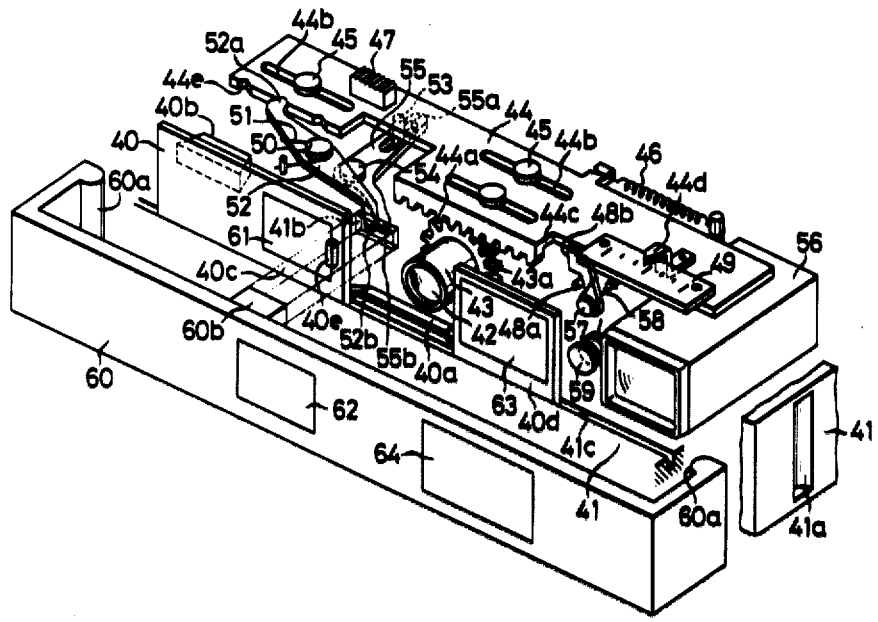
FIG. 5 is a perspective view of still another embodiment for which two lens units for special photography are usable, one being removably mountable on the camera body and the other being incorporated in the camera body.

FIG. 5 shows an embodiment in which a lens unit 40 for special photography is housed in a camera body 41 and another lens unit 60 for special photography is also detachably mountable on the camera body from outside.

A focusing member 44 slidably supported by the camera body 41 (shown partly only) by means of guide pins 45 and slots 44b has a rack 44a meshing with a gear 41a on a focusing ring 43 including a main taking lens 42 and is biased by a spring 46 rightward in the drawing. A knob 47, when manipulated, moves the focusing member 44 rightward or leftward to rotate the focusing ring 43 and to thereby move the main taking lens 42 for focusing.

The focusing member 44 is further formed in its front edge with several notches 44e for determining the focused positions of the main taking lens 42 in corresponding relation to subject distances. A latch member 52 pivotally supported by a pin 50 and biased by a spring 51 in a clockwise direction has a front end 52a engageable with the notches 44e. When the camera is in condition for ordinary photography, the front end 52a of the latch member 52 engages in one of the notches 44e after the focused position of the main taking lens 42 has been determined in order to retain the focusing member 44 against the action of the spring 46.

By forcing the focusing member 44 to slide rightward or leftward against the retaining force of the latch member 52, the main taking lens 42 can be focused as in the case of FIG. 1. When relieved of the force after focusing, the focusing member 44 travels rightward under the action of the spring 46. Inasmuch as the front end 52a of the latch member 52 is in sliding contact with the front edge of the focusing member 44, the notch 44e positioned on the left of the front end 52a and most proximate to the end 52a engages the end 52a upon reaching the position of the end 52a, whereby the focusing member 44 is prevented from further rightward travel. The focusing procedure may be followed with reference to the scale on a subject distance indicating plate 49 pointed by an index mark 44d fixedly provided on the focusing member 44.

The lens unit 40 for special photography housed in the camera body 41 is supported slidably along a groove 41c formed in the body 41. A knob 40e exposed from the camera body 41 is gripped to slidingly move the unit 40 leftward or rightward in the drawing.

The lens unit 40 for special photography comprises a frame 40c holding a lens 61 for special photography, a frame 40d holding a finder correction lens 63 and a connecting bar 40a connecting both the frames 40c and 40d together. A projection 40b is formed on the rear surface of the frame 40c. When the lens unit 40 is set in position for special photography, the finder correction lens 63 is set in front of a finder 56 to correct the finder view field. Moreover, it is made large enough to cover the front of a photocell 59 so as to correct the angle and amount of incident light on the photocell 59 and to accurately measure the amount of light from the subject.

Figure 6:
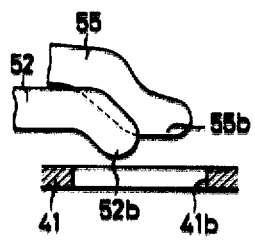
FIG. 6 is a fragmentary plan view of the same.

In the path of movement of the rear projection 40b during the rightward sliding travel of the unit 40 for special photography, there are positioned, as seen in FIG. 6, the rear end 52b of the latch member 52 and the cam portion 55b of a control cam lever 55 supported by a pin 54 and pivotally movable about the pin 54 in operative relation to the focusing member 44 by means of a pin 53 projecting from the under surface of the member 44 and engaged in its slot 55a. The rightward sliding travel of the unit 40 for special photography first causes the projection 40b to push the rear end 52b of the latch member 52, thereby turning the member 52 in a counterclockwise direction. Subsequently, the projection 40b comes into contact with the cam portion 55b of the cam lever 55. Thus the projection 40b determines the position of the focusing member 44.

The rightward sliding movement of the unit 40 for special photography first turns the latch member 52 in a counterclockwise direction to unlatch the focusing member 44, which in turn slidingly moves rightward under the action of the spring 46, rotating the focusing ring 43 clockwise and turning the focusing ring 43 also clockwise. Consequently, the cam portion 55b advances largely into the path of movement of the projection 40b.

To limit the amount of rightward travel of the focusing member 44, there is disposed a stopper 48a opposing the end surface 44c of the rack 44a. Also disposed is a shock absorbing member 48b adapted for contact with the end surface 44c before it strikes against the stopper 48a to absorb the impact of stopping action thereof. The shock absorbing member 48b, pivoted by a pin 57 and biased in a counterclockwise direction by a spring 58 that is weaker than the spring 46, is pisitioned in the path of advance of the end surface 44c for the absorption of shock.

Subsequent to the unlatching of the focusing member 44, the projection 40b of the unit 40 strikes against the cam portion 55b of the cam lever 55 and turns the lever 55 in a counterclockwise direction. When the end surface of projection 40b has come into contact with the cam portion 55b, the unit 40 is stopped by an unillustrated stopper and prevented from further rightward travel.

At the stopped position, the lens 61 for special photography is positioned in front of the main taking lens 42 with its optical axis coinciding with that of the lens 42, whilst the finder correction lens 63 is set in correct position in front of the finder 56. The focusing member 44 has its position determined by the projection 40b which has turned the cam lever 55 in a counterclockwise direction as described above, setting the main taking lens 42 in a specified focused position for special photography.

To take an ordinary photograph in this state, the lens unit 40 for special photography is moved leftward to a predetermined retracted position, permitting the projection 40b to free the cam lever 55 and the latch member 52. The camera is ready for ordinary photography therefore.

The other lens unit 60 for special photography detachably mountable on the camera body 41 and has a lens 62 for special photography different from the lens 61 in magnification or function, a finder correction lens 64 capable of covering the light paths for the finder 56 and the photocell 59, projections 60a detachably engageable in grooves 41a in the sides of the camera body 41, and a project tion 60b adapted to be placed into the camera body through its front window 41b to contact the rear end 52b of the latch member 52 and then the cam portion 55b of the cam lever 55. As described in detail with reference to FIG. 1, the projection 60b and projection 40b have different heights such that in corresponding relation to the lenses 61 and 62 included in the units 40 and 60 for different photographing purposes, they provide the best focus and least aberration for the main taking lens 42 in connection with the lenses 61 and 62.

Mounting the unit 60 on the camera body 41 as is the case with the FIGS. 1 and 3 first causes the projection 60b to contact the rear end 52b of the latch member 52 as disposed in FIG. 6, disengaging the focusing member 44 from the member 52. The projection 60b thereafter acts on the cam portion 55b of the cam lever 55, causing the focusing member 44 to set the main taking lens 42 at a specified focused position.

When mounting the unit 60 on the camera body 41, the other lens unit 40 for special photography housed in the camera body 41 need be retracted to the position for ordinary photography as shown in FIG. 5.

The latch member and the control cam member in each of the foregoing embodiments must be so adapted that the focusing member is first freed from the latch member by mounting the unit, following by the determination of the position of the focusing member by means of the control cam member or directly. If the focusing member 24 is not biased in one direction as shown in FIG. 3, the latch member 12 can be omitted, in which case the projection 19b of the unit 29 is also omitted.

Further in the foregoing embodiments, the focusing members 4, 24 and 44 need not necessarily be formed with the notches 4e and 44e but, while the lens unit for special photography is not mounted, the focusing member may be made retainable at a desired position against the spring force acting thereon by the frictional force acting between the spring-loaded latch member 12 or 52 and the focusing member.

What is claimed is:

1. An apparatus for adjusting the focus of the main taking lens of a camera comprising:
 a movable focussing member;
 a focussing ring for effecting the focussing movement of the main taking lens in operative relation to the movement of the focussing member; and
 a lens unit including a lens for special photography and a portion for setting the main taking lens to a predetermined focussed position which is dependent on the focal length of the special photography lens, and adapted to be set to a position for special photography in which the optical axis of the special photography lens registers with that of the main taking lens, the main taking lens setting portion of the lens unit, when the unit is positioned for special photography, acting on the focussing member to thereby set the main taking lens to said predetermined position.

2. The apparatus as set forth in claim 1 further comprising:
 a latch member for preventing the movement of the focussing member by elastic contact therewith at least while taking an ordinary photograph, and
 a projection included in the unit and operable by the unit being set in position to act on the latch member and to free the focusing member therefrom before the focusing member controlling portion of the unit acts on the focusing member.

3. The apparatus as set forth in claim 2 wherein the focussing member includes a pin projecting therefrom and the main taking lens setting portion of the lens unit, when the unit is set to the position for special photography, directly acts on the pin and determines the position of the focussing member in accordance with the focal length of the special photography lens, thereby setting the main taking lens to said predetermined position.

4. The apparatus as set forth in claim 1 further comprising:
 a control cam movable in operative relation to the movement of the focussing member and having a cam portion so disposed as to contact the main taking lens setting portion when the lens unit is set to the position for special photography, whereby the main taking lens setting portion acts through the cam on the focussing member and determines the position thereof in accordance with the focal length of the special photography lens, thereby setting the main taking lens to said predetermined focussed position.

5. The apparatus as set forth in claim 1 wherein the lens unit for special photography is detachably mountable on the camera body at a specified position outside thereof.

6. The apparatus as set forth in claim 1 wherein the lens unit for special photography is slidably housed in the camera body and settable in a specified position in front of the main taking lens for special photography.

7. The apparatus as set forth in claim 6 wherein there is provided another lens unit for special photography detachably mountable on the camera body at a specified position outside thereof.

8. The apparatus as set forth in claim 1 wherein a latch member for preventing the movement of the focusing member by elastic contact therewith is provided, and one projection formed on the lens unit for special photography serves as a portion of the lens unit operable to act on the latch member by the unit being set in position and also as the portion for controlling the focusing member, the rear end of the latch member for contact with the projection and a cam portion for contact with the projection being so arranged that the setting of the lens unit first causes the projection to contact the rear end, thereafter bringing the projection into contact with the cam portion to control the focusing member.

9. An apparatus for moving the lens of a camera for focussing comprising:
 a movable focussing member,
 a focussing ring for varying the amount of focussing movement of a main taking lens in operative relation to the movement of the focussing member,
 a lens unit for special photography including a lens for special photography having an optical axis to be brought into coincidence with that of the main taking lens when set in position, the unit having a portion operable to act on the focussing member by the unit being set in position and to control the focussing member when the unit is set in position, thereby setting the main taking lens in a specified focussed position for special photography,
 a latch member for preventing the movement of the focussing member by elastic contact therewith at least while taking an ordinary photograph, and
 a projection included in the unit and operable by the unit being set in position to act on the latch member and to free the focussing member therefrom before the focussing member controlling portion of the unit acts on the focussing member.

10. An apparatus for moving the lens of a camera for focussing comprising:
 a movable focussing member,
 a focussing ring for varying the amount of focussing movement of a main taking lens in operative relation to the movement of the focussing member,
 a lens unit for special photography including a lens for special photography having an optical axis to be brought into coincidence with that of the main taking lens when set in position, the unit having a portion operable to act on the focussing member by the unit being set in position and to control the focussing member when the unit is set in position, thereby setting the main taking lens in a specified focussed position for special photography,
 a latch member for preventing the movement of the focussing member by elastic contact therewith, and
 a projection formed on the lens unit for special photography serving as the portion of the lens unit operable to act on the latch member by the unit being set in position and also as the portion for controlling the focussing member, the rear end of the latch member for contact with the projection and a cam portion for contact with the projection being so arranged that the setting of the lens unit first causes the projection to contact the rear end, thereafter bringing the projection into contact with the cam portion to control the focussing member.

* * * * *